United States Patent
Bartko et al.

(10) Patent No.: US 12,212,056 B2
(45) Date of Patent: Jan. 28, 2025

(54) METHOD AND APPARATUS FOR REMOVAL OF A PARASITIC COUPLING IN AN ANTENNA ARRAY

(71) Applicant: Rohde & Schwarz GmbH & Co. KG, Munich (DE)

(72) Inventors: Hendrik Bartko, Unterhaching (DE); Adam Tankielun, Ottobrunn (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 169 days.

(21) Appl. No.: 18/166,007

(22) Filed: Feb. 8, 2023

(65) Prior Publication Data
US 2024/0266726 A1    Aug. 8, 2024

(51) Int. Cl.
*H01Q 1/52* (2006.01)
*H01Q 5/378* (2015.01)
*H04B 15/00* (2006.01)

(52) U.S. Cl.
CPC ............ *H01Q 1/523* (2013.01); *H01Q 5/378* (2015.01); *H04B 15/005* (2013.01)

(58) Field of Classification Search
CPC ....... H01Q 1/523; H01Q 5/378; H04B 15/005
See application file for complete search history.

(56) References Cited

U.S. PATENT DOCUMENTS

| | | | |
|---|---|---|---|
| 8,913,513 B2 * | 12/2014 | McGowan | H01Q 1/523 370/252 |
| 10,020,574 B2 * | 7/2018 | Gustavsson | H04B 7/0456 |
| 11,251,526 B2 * | 2/2022 | Onaka | H01Q 1/243 |
| 12,027,787 B2 * | 7/2024 | Gouchi | H01Q 21/065 |
| 2010/0309774 A1 * | 12/2010 | Astrom | H04B 1/525 370/201 |

FOREIGN PATENT DOCUMENTS

CN        111650553 B  *  3/2023   ............ G01S 3/14

\* cited by examiner

*Primary Examiner* — Seung H Lee
(74) *Attorney, Agent, or Firm* — Westman, Champlin & Koehler, P.A.

(57) ABSTRACT

A method and apparatus for removal of a parasitic coupling of a signal source to an output of an antenna array comprising at least one antenna element connected via an associated controllable switch to a signal receiver connected to the output of said antenna array, the method includes measuring a parasitic coupling signal received by the signal receiver connected to the output of said antenna array while all switches of the antenna array are switched off and a first reference signal received by a reference signal receiver; measuring a total reception signal for each antenna element and a second reference signal; calculating a parasitic coupling free reception signal for each antenna element by subtracting a ratio between the measured parasitic coupling signal and the measured first reference signal from a ratio between the total reception signal.

17 Claims, 3 Drawing Sheets

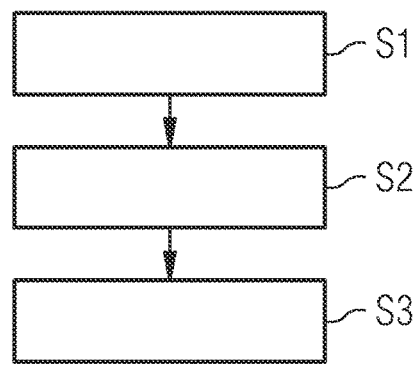
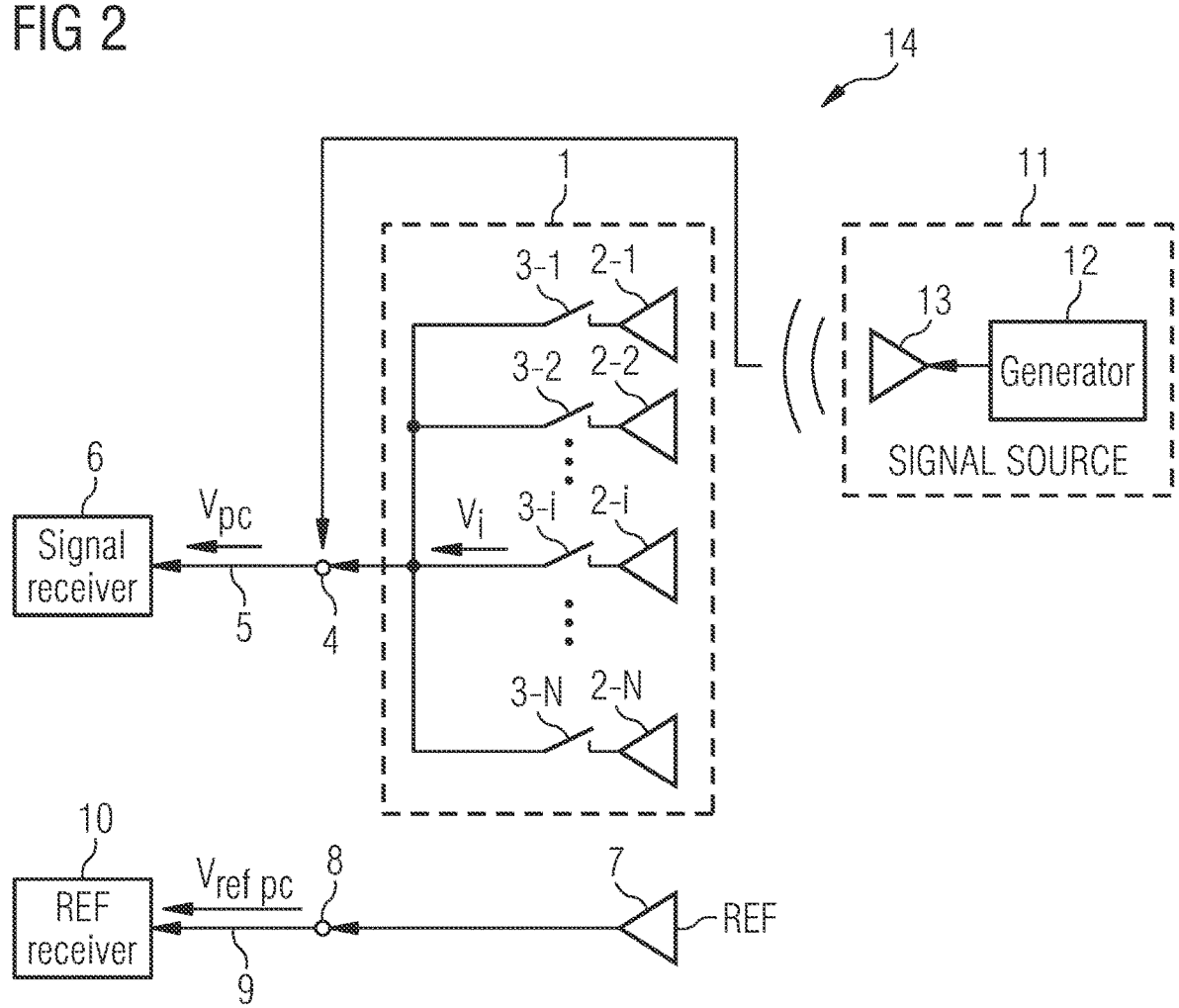

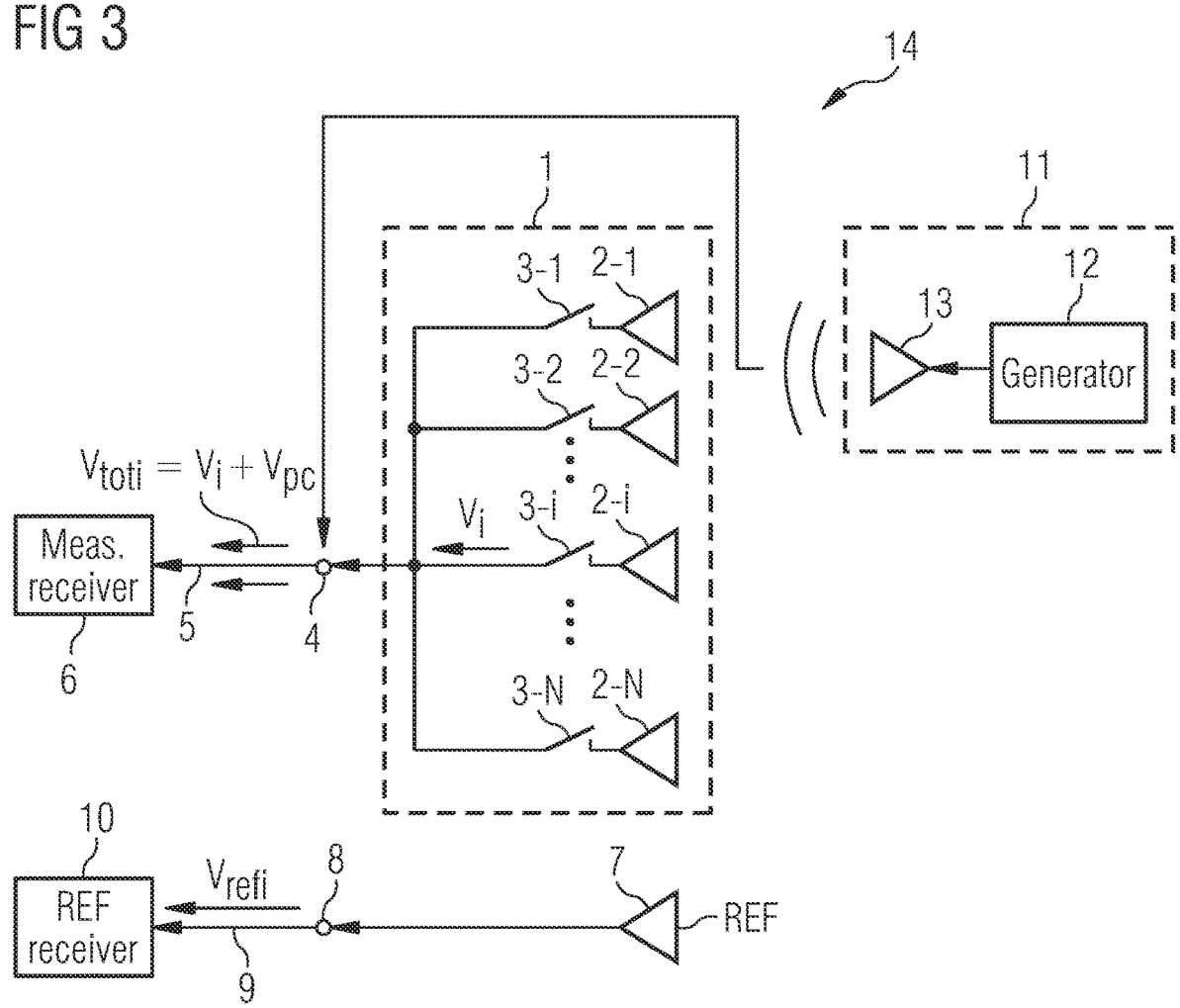

METHOD AND APPARATUS FOR REMOVAL OF A PARASITIC COUPLING IN AN ANTENNA ARRAY

TECHNICAL FIELD

The present invention relates to a method and an apparatus for removal of a parasitic coupling of a signal source to an output of an antenna array comprising at least one antenna element connected via an associated controllable switch to a receiver connected to an output of the antenna array.

TECHNICAL BACKGROUND

Electronically switched antenna arrays can comprise a plurality of antenna elements. A switched antenna array has a limited measurement dynamic range among its antenna elements due to a parasitic coupling of a radiation source to the RF output of the antenna array.

Accordingly, there is a need to provide a method and apparatus to reduce a parasitic coupling of a signal source to an output of an antenna array and to increase the dynamic range among antenna elements of the respective antenna array.

SUMMARY OF THE INVENTION

The invention provides according to a first aspect a method for removal of a parasitic coupling of a signal source to an output of an antenna array comprising at least one antenna element connected via an associated controllable switch to a signal receiver connected to the output of the antenna array, said method comprising the steps of: measuring in response to a signal radiated by a signal source a parasitic coupling signal received by the signal receiver connected to the output of said antenna array while all switches of the antenna array are switched off and measuring simultaneously a first reference signal received by a reference signal receiver, measuring in response to the signal radiated by the signal source a total reception signal for each antenna element of said antenna array received by the signal receiver connected to the output of said antenna array and measuring simultaneously a second reference signal received by the reference signal receiver, and calculating a parasitic coupling free reception signal for each antenna element of said antenna array by subtracting a ratio between the measured parasitic coupling signal and the measured first reference signal from a ratio between the total reception signal measured for the respective antenna element and the measured second reference signal.

In a possible embodiment of the method according to the first aspect of the present invention, the reference signal receiver is connected to a reference antenna for reception of the signal radiated by the signal source.

In a further possible embodiment of the method according to the first aspect of the present invention, the reference signal receiver is connected via a cable to the signal source.

In a further possible embodiment of the method according to the first aspect of the present invention, the signal receiver connected to the output of the antenna array and the reference signal receiver form phase coherent receivers.

In a still further possible embodiment of the method according to the first aspect of the present invention, the antenna array comprises more than one antenna element connected to a common output of said antenna array.

In a still further possible embodiment of the method according to the first aspect of the present invention, the total reception signal is measured for each antenna element of said antenna array by the signal receiver connected to the common output of said antenna array while the switch associated with the respective antenna element is switched on and all other switches of the remaining antenna elements of said antenna array are switched off.

In a further possible embodiment of the method according to the first aspect of the present invention, the signal radiated by the signal source comprises an RF signal.

In a still further possible embodiment of the method according to the first aspect of the present invention, the at least one antenna element of said antenna array comprises a single polarized antenna element.

In a further possible embodiment of the method according to the first aspect of the present invention, the at least one antenna element of said antenna array comprises a dual polarized antenna element.

In a still further possible embodiment of the method according to the first aspect of the present invention, the signal source comprises a transmission antenna connected to a signal generator.

In a still further possible embodiment of the method according to the first aspect of the present invention, the signal source is provided at a base station.

The invention provides according to a second aspect a near field scanning apparatus, the apparatus comprising:
- at least one antenna array having at least one antenna element connected via an associated controllable switch to an output of the antenna array,
- a signal receiver connected to the output of said antenna array and
- an antenna array calibrator adapted to calibrate the antenna array of said near field scanning apparatus,
- said antenna array calibrator comprising a measurement unit and a processor,
- wherein the measurement unit of the antenna array calibrator is adapted to measure in response to a signal radiated by a signal source a parasitic coupling signal received by the signal receiver connected to the output of said antenna array while all switches of the antenna array are switched off, while the measurement unit of the antenna array calibrator is adapted to measure simultaneously a first reference signal received by a reference signal receiver of the measurement unit,
- wherein the measurement unit of the antenna array calibrator is further adapted to measure for each antenna element of said antenna array in response to the signal radiated by the signal source a total reception signal received by the signal receiver connected to the output of said antenna array,
- while the measurement unit of the antenna array calibrator is adapted to measure simultaneously a second reference signal received by the reference signal receiver of the measurement unit,
- wherein the processor of the antenna array calibrator is adapted to calculate a parasitic coupling free reception signal for each antenna element of said antenna array by subtracting a ratio between the measured parasitic coupling signal and the measured first reference signal from a ratio between the total reception signal measured for the respective antenna element of said antenna array and the measured second reference signal.

In a possible embodiment of the near field scanning apparatus according to the second aspect of the present invention, the reference signal receiver of the measurement of the antenna array calibrator is connected to a reference antenna for reception of the signal radiated by the signal source.

In a further possible embodiment of the near field scanning apparatus according to the second aspect of the present invention, the reference signal receiver of the measurement unit of the antenna array calibrator is connected via a cable to a signal generator of a signal source.

In a still further possible embodiment of the near field scanning apparatus according to the second aspect of the present invention, the antenna array is provided in a flat panel of the near field scanning apparatus to scan an object located besides the flat panel.

In a further possible embodiment of the near field scanning apparatus according to the second aspect of the present invention, the antenna array comprises a number of transmit antennas adapted to radiate RF signals and a number of receive antennas adapted to receive RF signals.

In a further possible embodiment of the near field scanning apparatus according to the second aspect of the present invention, the near field scanning apparatus further comprises a data processing unit adapted to process the calculated free reception signals of the antenna array parasitic coupling elements of the calibrated antenna array to detect automatically potentially dangerous items at the scanned object.

In a still further possible embodiment of the near field scanning apparatus according to the second aspect of the present invention, the reference signal receiver of the measurement unit of the antenna array calibrator is connected to a reference antenna forming part of the antenna array or being connected to the measurement unit of the antenna array calibrator through an antenna connector.

In a still further possible embodiment of the near field scanning apparatus according to the second aspect of the present invention, the measurement unit of the antenna array calibrator comprises a signal source including a transmission antenna connected to a signal generator of the signal source.

In a further possible embodiment of the near field scanning apparatus according to the second aspect of the present invention, the transmission antenna of the signal source forms part of a further antenna array of said near field scanning apparatus.

Where appropriate, the above-mentioned configurations and developments can be combined in any manner. Further possible configurations, developments and implementations of the invention also include combinations, which are not explicitly mentioned, of features of the invention which have been described previously or are described in the following with reference to the embodiments. In particular, in this case, a person skilled in the art will also add individual aspects as improvements or supplements to the basic form of the present invention.

BRIEF DESCRIPTION OF THE DRAWINGS

The present invention is described in greater detail in the following on the basis of the embodiments shown in the schematic figures of the drawings, in which:

FIG. 1 illustrates a flowchart of a possible exemplary embodiment of a method for removal of a parasitic coupling according to a first aspect of the present invention;

FIG. 2 illustrates a first measurement step performed by the method illustrated in FIG. 1;

FIG. 3 illustrates a second measurement step performed by the method illustrated in FIG. 1;

Figure 4:
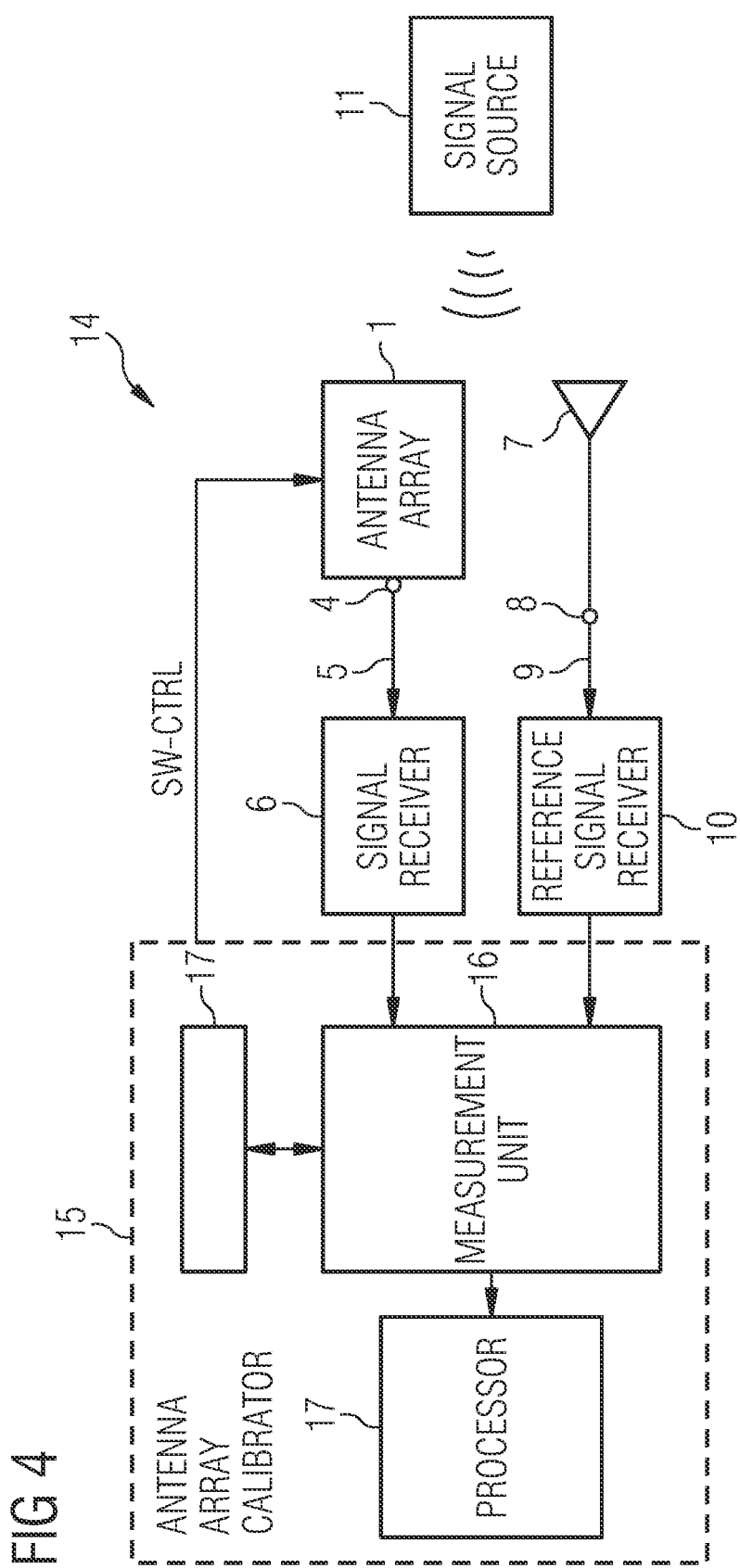
FIG. 4 shows a block diagram of a possible exemplary embodiment of a near field scanning apparatus according to a further aspect of the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings.

In the drawings, like, functionally equivalent and identically operating elements, features and components are provided with like reference signs in each case, unless stated otherwise.

DESCRIPTION OF EMBODIMENTS

FIG. 1 shows a flowchart of a possible exemplary embodiment of a method for removal of a parasitic coupling according to a first aspect of the present invention. The method illustrated in FIG. 1 is provided for removal or reducing of a parasitic coupling of a signal source 11 to an output 4 of an antenna array 1 as also illustrated in FIGS. 2, 3, 4. The antenna array 1 comprises at least one antenna element 2 connected via an associated controllable switch 3 and an output 4 of the antenna array 1 to a signal receiver 6. The signal receiver 6 can be connected to the output 4 of the respective antenna array 1 via a signal line 5. In the illustrated exemplary embodiment of FIG. 1, the method for removal of a parasitic coupling comprises three main steps.

In a first step S1, a parasitic coupling signal $V_{pc}$ received by the signal receiver 6 connected to the output 4 of the antenna array 1 is measured in response to a signal radiated by the signal source 11 while all switches 3-$i$ of the antenna array 1 are switched off. Simultaneously, a first reference signal $V_{ref\_pc}$ received by a reference signal receiver 10 is also measured in step S1.

In a further step S2, a total reception signal $V_{toti}$ for each antenna element 2-$i$ of said antenna array 1 received by the signal receiver 6 connected to the output 4 of the antenna array 1 in response to the signal radiated by the signal source 11 is measured. Simultaneously, a second reference signal $V_{refi}$ received by the reference signal receiver 10 is measured as well in step S2.

In a further step S3, a parasitic coupling free reception signal Vi for each antenna element 2-$i$ of said antenna array 1 is calculated by subtracting a ratio between the measured parasitic coupling signal $V_{pc}$ and the measured first reference signal $V_{ref\_pc}$ from a ratio between the total reception signal $V_{toti}$ measured for the respective antenna element 2-$i$ and the measured second reference signal $V_{refi}$.

FIG. 2 illustrates schematically a first measurement step performed by the method illustrated in the flowchart of FIG. 1.

As can be seen in FIG. 2, an antenna array 1 can comprise a number N of antenna elements 2-1 to 2-N. Each antenna element 2-$i$ of the antenna array 1 comprises an associated controllable switch 3-$i$ as shown in FIG. 2. The controllable antenna switches 3-1 to 3-N are connected to a common signal output 4 of the antenna array 1. The output 4 of the antenna array 1 is connected via a signal line 5 to a signal receiver 6 of an apparatus 14. Further, a separate reference antenna element 7 is provided having a signal output 8 connected via a signal line 9 to a reference signal receiver 10.

As can be seen in FIG. 2, the antenna elements 2-$i$ of the antenna array 1 and the reference antenna 7 can receive a signal radiated from a signal source 11. The signal source 11 can comprise a signal generator 12 connected to a transmission antenna 13. The method as illustrated in the flowchart of FIG. 1 is provided to cancel an unwanted parasitic coupling signal at the signal output 4 of the antenna array 1.

FIG. 2 illustrates the switching positions of the controllable switches 3-1 to 3-N of the antenna array 1 when performing the first measurement step S1 of the method as illustrated in FIG. 1. As can be seen in FIG. 2, in the first measuring step, all switches 3-1 to 3-N of the antenna array 1 are switched off. In response to the signal radiated by the transmission antenna 13 of the signal source 11, the parasitic coupling signal $V_{pc}$ received by the signal receiver 6 connected to the output 4 of the antenna array 1 is measured while all switches 3-1 to 3-N of the antenna array 1 are switched off as illustrated in FIG. 2. Simultaneously, a first reference signal $V_{ref\ pc}$ received by the reference signal receiver 10 is measured as well. The measured parasitic coupling signal $V_{pc}$ and the first reference signal $V_{ref\ pc}$ can be stored temporarily for further processing.

The first measurement step S1 is done with a disabled coupling of all antenna paths providing a parasitic coupling signal $V_{pc}$ only. To obtain a complex value of $V_{pc}$ independent from time, a first reference signal $V_{ref\ pc}$ is measured simultaneously in step S1.

FIG. 3 illustrates the switching positions of the controllable switches 3-1 to 3-N within the antenna array 1 when performing the second measuring step S2 illustrated in the flowchart of FIG. 1. In response to the signal radiated by the signal source 11, a total reception signal $V_{toti}$ is measured for each antenna element 2-i of the antenna array 1 received by the signal receiver 6 connected to the output 4 of the antenna array 1. Simultaneously, a second reference signal $V_{refi}$ received by the reference signal receiver 10 is measured in step S2. Both signals measured in the second measurement step S2, i.e. the total reception signal $V_{toti}$ and the second reference signal $V_{refi}$ can be stored temporarily for further processing. The total reception signal $V_{toti}$ provided for each antenna element 2-i of the number N of antenna elements of the antenna array 1 comprises a superposition of the wanted parasitic coupling free reception signal Vi and the unwanted parasitic coupling signal $V_{pc}$. At the same time, a time reference signal is measured, i.e. the second reference signal received by the reference signal receiver 10. The measurement step S2 illustrated in the flowchart of FIG. 1 is performed for all N antenna elements 2-i of the antenna array 1. FIG. 3 illustrates schematically the measurement for the antenna element 2-i having its associated switch 3-i switched on. The total reception signal $V_{toti}$ is measured for each antenna element 2-i of the antenna array 1 by the signal receiver 6 connected to the common output 4 of the antenna array 1 while the switch 3-i associated with the respective antenna element 2-i is switched on and all other switches 3-1 to 3-(i−1) and switches 3-(i+1) to 3-N of the remaining antenna elements 2 (i.e. antenna elements 2-1 to 2-(i−1) and (2-i)+1 to 2-N) of said antenna array 1 are switched off as illustrated schematically in FIG. 3. The measurement of the total reception signal is performed for each antenna element 2-i, i.e. N individual measurements for all individual antenna elements 2-1 to 2-N of the antenna array 1 are performed.

In total, N+1 complex valued measurements are performed in step S1 and step S2. In order to cancel the unwanted parasitic coupling signal at the antenna array output 4 an antenna array 1 having N antenna elements 2 N+1 complex valued measurements are performed.

Subtraction of two complex signals provides a parasitic coupling free signal Vi. Accordingly, in a third step S3 of the flowchart illustrated in FIG. 1, a parasitic coupling free reception signal Vi for each antenna element 2-i of said antenna array 1 is calculated by subtracting a ratio between the measured parasitic coupling signal $V_{pc}$ and the measured first reference signal $V_{ref\ pc}$ from a ratio between the total reception signal $V_{toti}$ measured for the respective antenna element 2 and the measured second reference signal $V_{refi}$.

Accordingly, a restoration of a parasitic coupling free reception signal Vi for each antenna element 2 can be calculated as follows:

$$V_i = V_{tot,i}/V_{ref,i} -\ V_{pc}/V_{ref,pc}$$
$$S21\ i = S21\ tot, i - S21\ pc$$

As illustrated in FIGS. 2, 3, the reference signal receiver 10 can in a possible embodiment be connected to a reference antenna 7 for reception of the signal radiated by the signal source 11. In an alternative embodiment, the reference signal receiver 10 can also be connected via a cable to the signal generator 12 of the signal source 11. In a possible embodiment, the signal receiver 6 connected to the output 4 of the antenna array 1 and the reference signal receiver 10 form phase coherent receivers.

The number N of antenna array elements 2 of the antenna array 1 can vary depending on the use case. Each antenna element 2-i can be connected via its associated switch element 3-i to the common signal output 4 of the antenna array 1. The switches 3-i can be controlled by a switch controller which controls the switching positions of the respective switch elements 3-i during the measurement procedure, i.e. during measurement step S1 and measurement step S2 illustrated in the flowchart of FIG. 1. Additionally, all switch elements 3-i of the antenna array 1 are switched off when performing the first measurement step S1. During the second measurement step S2, measurement is performed for each individual antenna element 2-i having its associated element switch 3-i closed as illustrated schematically in FIG. 3. In a possible implementation, the switching elements 3-1 to 3-N are subsequently closed while the remaining switching elements 3-i are open. The signal radiated by the signal source 11 during the measurement steps comprises in a preferred embodiment an RF signal. The measurement procedure can be performed by using any transmitting source and antenna placed at any relative position versus receive antenna. The measurement can be performed without requirement for any moving elements in the measurement system. Further, the measurement can be realized with a pair of phase coherent RF receivers that may be provided inside a VNA or by using power sensors.

The antenna elements 2-i within the antenna array 1 can comprise single polarized antenna elements or dual polarized antenna elements. Even for dual polarized antenna elements only one measurement for the parasitic coupling is necessary. The signal source 11 adapted to radiate the RF signal can be provided in a possible embodiment at a base station. In an alternative embodiment, the signal source 11 can form part of a measurement equipment.

In a possible embodiment, the reference antenna 7 is located besides the antenna array 1. In an alternative implementation, the reference antenna 7 can also form part of the antenna array 1 and can be switched by an associated switching element to the reference signal receiver 10.

FIG. 4 shows a block diagram of an apparatus 14 comprising at least one antenna array 1 calibrated or recalibrated using the method as illustrated in the flowchart of FIG. 1. The apparatus 11 illustrated in the block diagram of FIG. 4 can comprise a near field scanning apparatus. The near field scanning apparatus 14 comprises at least one antenna array 1 having at least one antenna element 2 connected via an associated controllable switch 3 to an output 4 of the antenna array 1. The signal receiver 6 is connected to the output 4 of the antenna array 1 of said apparatus 14. As can be seen in the block diagram of FIG. 4, the apparatus 14 comprises an antenna array calibrator 15 adapted to calibrate the antenna array 1 of the apparatus 14. The antenna array calibrator 15 comprises a measurement unit 16 and a processor 17. The controller 17 is adapted to control the antenna switching elements 3-i of the antenna array 1 during the measurement of the reception signals performed by the signal receivers 6, 10. The measurement unit 16 of the antenna array calibrator 15 is adapted to measure in response to a signal radiated by the signal source 11 a parasitic coupling signal $V_{pc}$ received by the signal receiver 6 connected to the output 4 of the antenna array 1 while all switches 3-1 to 3-N of the antenna array 1 are switched off. Simultaneously, the measurement unit 16 of the antenna array calibrator 15 is adapted to measure a first reference signal $V_{ref\ pc}$ received by the reference signal receiver 10 connected to the measurement unit 16 when the switches 3-1 to 3-N of the antenna array 1 are switched off. The parasitic coupling signal $V_{pc}$ received by the signal receiver 6 and measured by the measurement unit 16 as well as the simultaneously measured first reference signal $V_{ref\ pc}$ received by the reference signal receiver 10 and measured by the measurement unit 16 can be stored temporarily in a data memory for further processing by the processor 17.

After the first measurement step S1 has been completed, the measurement unit 16 of the antenna array calibrator 15 is adapted to perform a second measurement step S2. The measurement unit 16 of the antenna array calibrator 15 is adapted to measure for each antenna element 2-i of the antenna array 1 in response to the signal radiated by the signal source 11 a total reception signal $V_{toti}$ received by the signal receiver 6 connected to the output 4 of the antenna array 1 while measuring simultaneously a second reference signal $V_{refi}$ received by the reference signal receiver 10 connected to the measurement unit 16. The second measurement step S2 is performed for each of the N antenna elements 2-i of the antenna array 1 while its associated antenna switch 3-i is closed and the remaining antenna switches are switched off. In response to the signal radiated by the signal source 11, a total reception signal $V_{toti}$ for each antenna element 2-i of the antenna array 1 received by the signal receiver 6 connected to the output 4 of the antenna array 1 is measured and stored in a data memory for further processing by the processor 17. The simultaneously measured second reference signal $V_{refi}$ received by the reference signal receiver 10 is also stored for each antenna element 2-i of the antenna array 1 in a data memory for further processing by the processor 17.

The processor 17 of the antenna array calibrator 15 is adapted to calculate a parasitic coupling free reception signal Vi for each antenna element 2-i of the antenna array 1 by subtracting a ratio between the measured parasitic coupling signal $V_{pc}$ and the measured first reference signal $V_{ref\ pc}$ from a ratio between the total reception signal $V_{toti}$ measured for the respective antenna element 2-i of the antenna array 1 and the associated measured second reference signal $V_{refi}$.

In the illustrated embodiment of FIG. 4, the measurement unit 16 of the antenna array calibrator 15 is connected to a reference signal receiver 10 adapted to receive a signal radiated by the signal source 11 by means of a reference signal antenna 7. In an alternative embodiment, the measurement unit 16 can also be connected directly via a cable to the signal generator 12 of the signal source 11.

In a possible embodiment, the antenna array 1 as shown in FIG. 4 can be provided in a flat panel of a near field scanning apparatus 14 to scan an object located besides the flat panel. The antenna array 1 may comprise a number of reception antennas adapted to receive RF signals. The antenna array 1 may also comprise a number of transmission antennas adapted to radiate RF signals. A data processing unit of the near field scanning apparatus 14 can be adapted to process the calculated parasitic coupling free reception signals Vi of the antenna elements 2-i of the calibrated antenna array 1 to detect automatically potentially dangerous items at the scanned object. The object may comprise a person standing close to the antenna array 1 of the near field scanning apparatus 14. To find conspicuous objects a detection software may use an algorithm based on artificial intelligence. The near field scanning apparatus 14 can search for anomalies that indicate unusual items carried by the scanned object.

The calibration procedure performed by the antenna array calibrator 15 of the scanning apparatus 14 allows to increase the measurement dynamic range among the antenna elements 2-i of the antenna array 1. The calibration procedure removes or minimizes the effects of a parasitic coupling of a radiation source to an RF output 4 of the antenna array 1. The method according to the present invention can be applied to any kind of electronically switched antenna arrays, in particular for antenna arrays 1 of near field scanners.

The calibration procedure can be performed in a calibration operation mode of the apparatus 14. The calibration of the antenna array 1 can be performed in a possible embodiment after manufacturing or setup of the apparatus 14. In a near field scanning apparatus 14 the calibration and/or recalibration of its antenna array 1 can increase the detection rate of suspicious items due to the increased dynamic measurement range.

Although the present invention has been described in the above by way of preferred embodiments, it is not limited thereto, but rather can be modified in a wide range of ways. In particular, the invention can be changed or modified in various ways without deviating from the core of the invention.

What we claim is:

1. A method for removal of a parasitic coupling of a signal source to an output of an antenna array comprising at least one antenna element connected via an associated controllable switch to a signal receiver connected to the output of said antenna array, the method comprising:
   measuring in response to a signal radiated by a signal source a parasitic coupling signal, Vpc, received by the signal receiver connected to the output of said antenna array while all switches of the antenna array are switched off and measuring simultaneously a first reference signal, Vref pc, received by a reference signal receiver;
   measuring in response to the signal radiated by the signal source a total reception signal, Vtoti, for each antenna element of said antenna array received by the signal receiver connected to the output of said antenna array and measuring simultaneously a second reference signal, Vrefi, received by the reference signal receiver;

calculating a parasitic coupling free reception signal, Vi, for each antenna element of said antenna array by subtracting a ratio between the measured parasitic coupling signal, Vpc, and the measured first reference signal, Vref pc, from a ratio between the total reception signal, Vtoti, measured for the respective antenna element and the measured second reference signal, Vrefi.

2. The method of claim 1 wherein the reference signal receiver is connected to a reference antenna for reception of the signal radiated by the signal source or is connected via a cable to the signal source.

3. The method of claim 1 wherein the signal receiver connected to the output of said antenna array and the reference signal receiver form phase coherent receivers.

4. The method of claim 1 wherein the antenna array comprises more than one antenna element connected to a common output of said antenna array.

5. The method of claim 4 wherein the total reception signal, Vtoti, is measured for each antenna element of said antenna array by the signal receiver connected to the common output of said antenna array while the switch associated with the respective antenna element is switched on and all other switches of the remaining antenna elements of said antenna array are switched off.

6. The method of claim 1 wherein the signal radiated by the signal source comprises an RF signal.

7. The method of claim 1 wherein the at least one antenna element of said antenna array comprises a single polarized antenna or a dual polarized antenna element.

8. The method of claim 1 wherein the signal source comprises a transmission antenna connected to a signal generator.

9. The method of claim 1 wherein the signal source is provided at a base station.

10. A near field scanning apparatus, the apparatus comprising:
- at least one antenna array having at least one antenna element connected via an associated controllable switch to an output of the antenna array;
- a signal receiver connected to the output of said antenna array; and
- an antenna array calibrator adapted to calibrate the antenna array of said near field scanning apparatus,
- wherein said antenna array calibrator comprising a measurement unit and a processor,
- wherein the measurement unit of the antenna array calibrator is adapted to measure in response to a signal radiated by a signal source a parasitic coupling signal, Vpc, received by the signal receiver connected to the output of said antenna array while all switches of the antenna array are switched off, while the measurement unit of the antenna array calibrator is adapted to measure simultaneously a first reference signal, Vref pc, received by a reference signal receiver connected to the measurement unit,
- wherein the measurement unit of the antenna array calibrator is further adapted to measure for each antenna element of said antenna array in response to the signal radiated by the signal source a total reception signal, Vtoti, received by the signal receiver connected to the output of said antenna array, while the measurement unit of the antenna array calibrator is adapted to measure simultaneously a second reference signal, Vrefi, received by the reference signal receiver of the measurement unit;
- wherein the processor of the antenna array calibrator is adapted to calculate a parasitic coupling free reception signal, Vi, for each antenna element of said antenna array by subtracting a ratio between the measured parasitic coupling signal, Vpc, and the measured first reference signal, Vref pc, from a ratio between the total reception signal, Vtoti, measured for the respective antenna element of said antenna array and the measured second reference signal, Vrefi.

11. The near field scanning apparatus of claim 10 wherein the reference signal receiver of the measurement unit of the antenna array calibrator is connected to a reference antenna for reception of the signal radiated by the signal source or is connected via a cable to a signal generator of the signal source.

12. The near field scanning apparatus of claim 10 wherein the antenna array is provided in a flat panel of the near field scanning apparatus to scan an object located besides the flat panel.

13. The near field scanning apparatus of claim 12 further comprising a data processing unit adapted to process the calculated parasitic coupling free reception signals, Vi, of the antenna elements of the calibrated antenna array to detect automatically potentially dangerous items at the scanned object.

14. The near field scanning apparatus according to claim 10 wherein the antenna array comprises a number of transmit antennas adapted to radiate RF signals and a number of receive antennas adapted to receive RF signals.

15. The near field scanning apparatus of claim 10 wherein the reference signal receiver of the measurement unit of the antenna array calibrator is connected to a reference antenna forming part of the antenna array or being connected to the measurement unit through an antenna connector.

16. The near field scanning apparatus of claim 10 wherein the measurement unit of the antenna array calibrator comprises a signal source including a transmission antenna connected to a signal generator of the signal source.

17. The near field scanning apparatus of claim 16 wherein the transmission antenna of the signal source forms part of an antenna array of said near field scanning apparatus.

* * * * *